(12) United States Patent
Johnston

(10) Patent No.: US 6,328,524 B1
(45) Date of Patent: *Dec. 11, 2001

(54) CASK TRANSPORTER

(75) Inventor: Roger L. Johnston, Muskego, WI (US)

(73) Assignee: J&R Engineering Company, Inc., Mukwonago, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/362,275

(22) Filed: Jul. 27, 1999

Related U.S. Application Data

(63) Continuation of application No. 08/250,378, filed on May 27, 1994, now Pat. No. 6,017,181.

(51) Int. Cl.$^7$ ............................................. B60P 3/00
(52) U.S. Cl. ........................... 414/460; 414/495; 212/324; 212/344
(58) Field of Search .................. 414/146, 458, 414/459, 460, 461, 495, 496, 911; 212/324, 343, 344

(56) References Cited

U.S. PATENT DOCUMENTS

| | | | |
|---|---|---|---|
| 2,775,357 | 12/1956 | Arment | 214/390 |
| 3,381,833 | 5/1968 | Gordon | 214/392 |
| 3,494,492 | 2/1970 | Thiermann | 214/396 |
| 3,543,884 | 12/1970 | Riedner | 187/87 |
| 3,750,811 | 8/1973 | Anderson et al. | 214/394 |
| 4,020,960 | 5/1977 | Louis et al. | 214/390 |
| 4,055,508 | 10/1977 | Yoli et al. | 252/301.1 |
| 4,269,560 | 5/1981 | Thomas | 414/459 |
| 4,275,982 | 6/1981 | Fisco | 414/459 |
| 4,295,777 | 10/1981 | Bell et al. | 414/458 |
| 4,372,725 | 2/1983 | Moore et al. | 414/460 |
| 4,381,839 * | 5/1983 | Engler et al. | 212/314 |
| 4,433,952 | 2/1984 | Glickman | 414/460 |
| 4,551,059 | 11/1985 | Petoia | 414/459 |
| 4,573,853 * | 3/1986 | Lorenz | 212/324 X |
| 4,599,030 * | 7/1986 | Skaalen et al. | 212/344 X |
| 4,683,969 | 8/1987 | Littau | 180/6.48 |
| 4,712,966 | 12/1987 | Gross | 414/458 |
| 4,725,185 | 2/1988 | Neagu | 414/540 |
| 4,763,800 * | 8/1988 | Engler et al. | 212/324 X |
| 4,820,110 | 4/1989 | Efird | 414/458 |
| 5,018,930 | 5/1991 | Hardin et al. | 414/458 |
| 5,360,123 * | 11/1994 | Johnston | 212/324 |
| 5,839,874 * | 11/1998 | Johnston | 414/459 |
| 5,865,327 | 2/1999 | Johnston | 212/343 |

FOREIGN PATENT DOCUMENTS

| | | | |
|---|---|---|---|
| 2659073 * | 9/1991 | (FR) | 212/324 |
| 591392 * | 2/1978 | (SU) | 212/324 |
| 688419 * | 10/1979 | (SU) | 212/323 |

OTHER PUBLICATIONS

Transporter Conceptual Design Drawings, NAP–0089, Rev. O, Jul. 1996.

* cited by examiner

Primary Examiner—James W. Keenan
(74) Attorney, Agent, or Firm—Boyle Fredrickson Newholm Stein & Gratz S.C.

(57) ABSTRACT

A cask transporter for engaging, lifting and safely transporting casks containing nuclear waste material. The cask transporter comprises a gantry structure including a plurality of extendible telescoping boom assemblies coupled to a beam. A platform is coupled to and supports the gantry structure and couples the gantry structure to a driven tread mechanism. Couplers couple the beam to a cask to be transported, and cushioned restraints restrain a cask from colliding with the cask transporter.

26 Claims, 2 Drawing Sheets

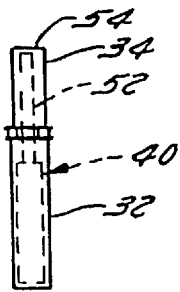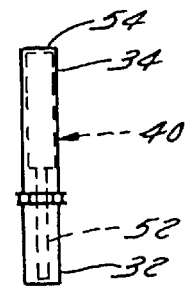
FIG. 4A     FIG. 4B
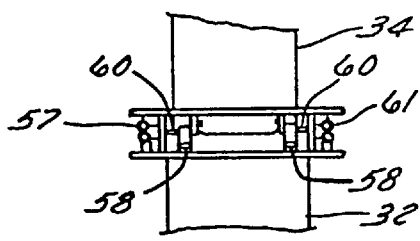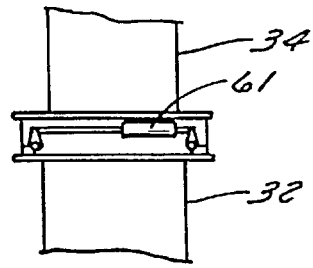
FIG. 5A     FIG. 5B
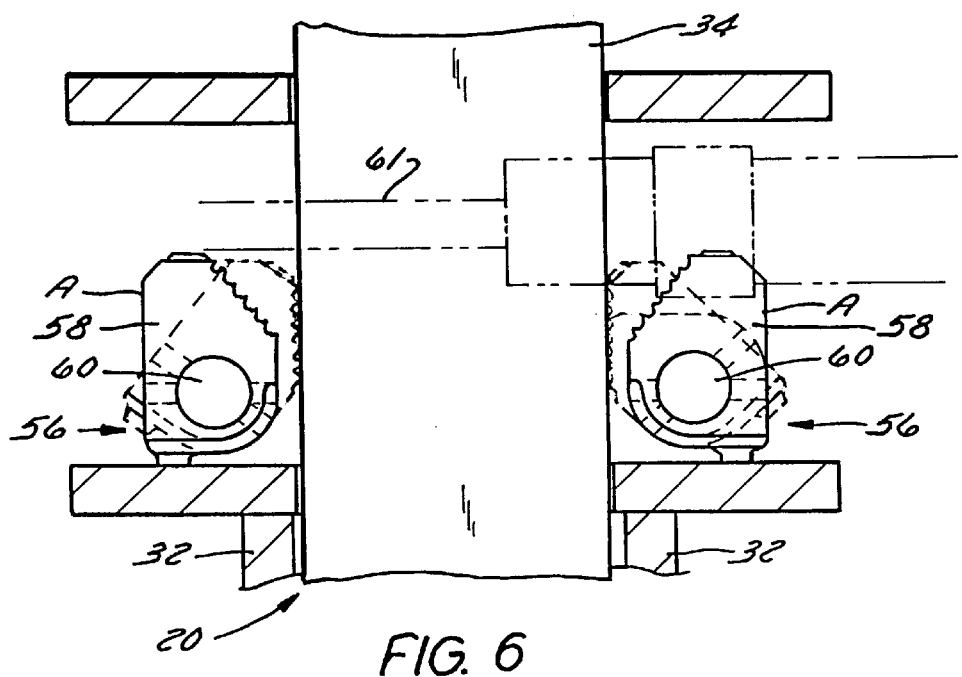
FIG. 6

CASK TRANSPORTER

REFERENCE TO A RELATED APPLICATION

This application is a continuation of Ser. No. 08/250,378, filed May 27, 1994 and entitled CASK TRANSPORTER, now U.S. Pat. No. 6,017,181.

BACKGROUND OF THE INVENTION

This invention relates generally to mobile lifting equipment and, more particularly, to a mobile gantry for transporting casks for nuclear power facilities.

Safe storage of spent fuel rods for nuclear power facilities is a problem of increasing magnitude. In the past, spent fuel rods were typically housed in storage facilities which carefully controlled the storage environment. Steadily increasing volumes of this radioactive waste have led to a search for more cost effective storage alternatives. A leading alternative is a system using a specially designed storage casks to house significant amounts of radioactive waste. These containers are designed to withstand the elements, and can therefore be stored outside without requiring the precise control systems of expensive storage facilities.

While the cask storage system has significant benefits, this approach has led to a need for a reliable vehicle design capable of transporting casks weighing up to 135 tons. Substantial lifting capacity is not the only feature of an ideal cask transporter. A compact design which does not damage nuclear power facility floors while safely transporting heavy casks is also desirable.

In view of the foregoing, it is a general object of the present invention to provide a new and improved vehicle for transporting casks for nuclear power facilities.

It is a further object of the present invention to provide a new and improved mobile gantry for transporting casks that is compact and does not damage nuclear power facility floors.

It is a further object of the present invention to provide a new and improved cask transporter capable of safe and smooth traverse of uneven ground.

SUMMARY OF THE INVENTION

The invention provides a mobile gantry for transporting casks for the nuclear power facilities. The gantry comprises telescoping boom assemblies coupled to a beam. Coupling devices connect the beam to the cask for transport. The gantry is connected to a platform which carries an engine and a control console. The engine powers a hydraulic pump which provides pressurized hydraulic fluid to hydraulic motors and to hydraulic cylinders which extend the boom assemblies. The hydraulic motors are coupled to tread mechanisms. The tread mechanisms greatly reduce the floor loading concentrations and allow the vehicle to traverse uneven ground smoothly. A restraining mechanism is provided which prevents uncontrolled swinging of the cask. A cam-locking mechanism prevents unexpected retraction of the boom assemblies, increasing the safety of the design.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 4A is a front sectional view of the boom assembly with a lift cylinder in an upright orientation, and FIG. 4B is a front sectional view of the boom assembly with a lift cylinder in an inverted orientation.

FIG. 5A is a detailed side view of a cam locking mechanism shown in FIGS. 1 and 2 and FIG. 5B is a detailed front view of the cam locking mechanism shown in FIGS. 1, 2 and 5A.

FIG. 6 is a front view of a cam engaging a boom assembly.

DESCRIPTION OF THE PREFERRED EMBODIMENT

Figure 1:
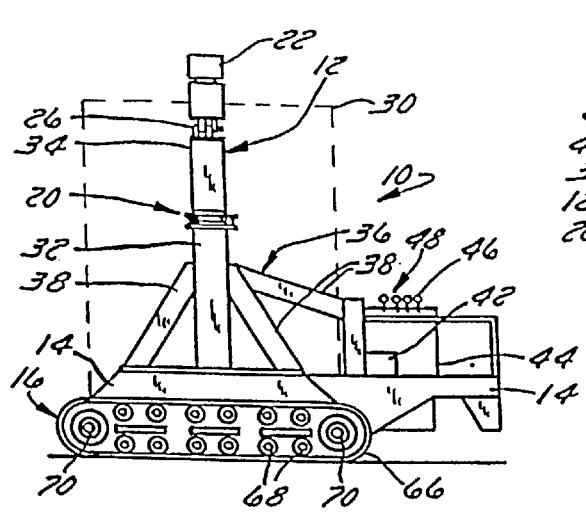
FIG. 1 is a front view of the cask transporter system embodying various features of the invention.

Referring to the figures, and, in particular, to FIG. 1, a cask transporter system 10 includes a gantry 12, a platform 14 and two tread mechanisms 16. The cask transporter system 10 generally comprises a self-propelled vehicle that lifts, transports and positions radioactive waste storage casks. The gantry 12 is connected to the platform 14, which is connected to the tread mechanisms 16. The tread mechanisms 16 are spaced apart by the platform 14 and the gantry 12 and are driven by conventional hydraulic motors 18.

The gantry 12 includes two extendible boom assemblies 20, a beam 22 and a restraining system 24. The beam 22 is connected by pin joints 26 at the tops of the boom assemblies 20 to allow for slight variance in the extension of the two boom assemblies 20. The joints 26 provide excellent lateral stiffness while allowing extension discrepancies to take place without fatigue or failure of the beam 22.

Figure 2:
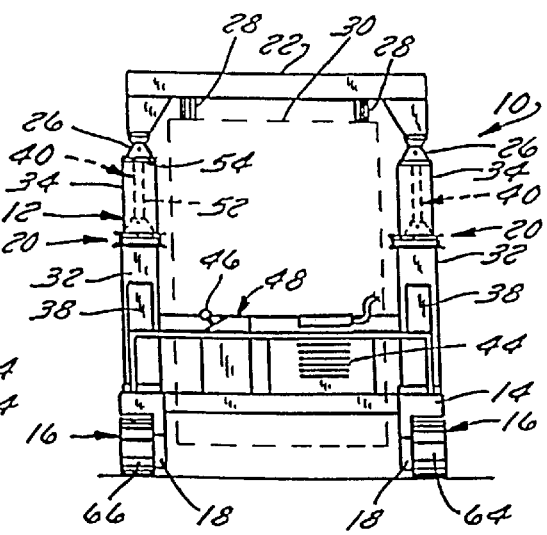
FIG. 2 is a side view of the cask transporter shown in FIG. 1.

Conventional couplers 28 such as chains, cables or other conventional rigging equipment are used to connect a cask 30 to the beam 22 for transporting as shown in FIG. 2. As can be seen in the drawings, the cask 30 is a substantially cylindrical, vertically orientated cask. The cask can be 17 feet high and weigh up to 135 tons. The cask 30 is coupled to the beam 22 when the boom assemblies 20 are fully retracted. The boom assemblies 20 must then be extended to lift the cask 30 off the ground with the beam 22 and the couplers 28.

Figure 3:
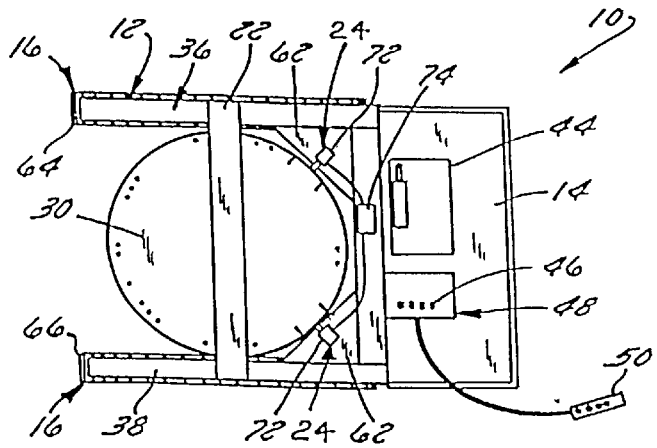
FIG. 3 is a top view of the cask transporter shown in FIG. 2.

The boom assemblies 20 each comprise an outer support section 32 and an inner telescoping section 34 slidably received within the outer support section 32. The outer support section 32 is securely connected to the platform 14 by support structures 36. It will be apparent to one of ordinary skill in the art that a wide variety of support structures can be used equivalently to support the extendable boom assemblies 20. However, angled structures 38 connected to the platform 14 as shown in FIGS. 1 and 3 are preferably used.

A hydraulic cylinder 40 is connected to the outer support section 32 and is disposed within the inner telescoping section 34 of each boom assembly 20. The hydraulic cylinder 40 is supplied with pressurized hydraulic fluid by a hydraulic pump 42 driven by a propane engine 44 mounted on the platform 14. The flow of the pressurized hydraulic fluid is controlled by a conventional valve 46 mounted in the control console 48. The valve 46 can be controlled from the control console 48 or from an auxiliary pendant control 50 which enables remote operation of the system 10. All of the hydraulic components are coupled by a conventional hydraulic system in a manner which will be apparent to one of ordinary skill in the art.

The inner telescoping section 34 in each boom assembly 20 is extended under power from the hydraulic cylinder 40 when the pressurized fluid is directed through the valve 46 to the hydraulic cylinder 40. The ram 52 of the hydraulic cylinder 40 extends upward (in the upright configuration shown in FIG. 4A) to contact the upper plate 54 of the inner telescoping section 34, thereby extending the inner telescoping section 34 as well. The hydraulic cylinder 40 can also be mounted in an inverted position as shown in FIG. 4B.

Because the outer support section 32 is securely connected to the platform 14 and the tread mechanism 16, and because the boom assemblies 20 are connected to the beam 22, the beam 22 extends upward coordinately with the boom assemblies 20. The connection between the cask 30 and the beam 22 using the couplers 28 lifts the cask 30 coordinately with the beam 22. In this way, the cask 30 is raised to a transport position. If additional lifting height is desired, multiple stage boom assemblies such as the assemblies shown in U.S. patent application Ser. No. 07/971,333, filed Nov. 4, 1992 (and assigned to the assignee of the present application), now U.S. Pat. No. 5,865,327 can be used.

In order to improve the security of a raised cask 30, the boom assemblies 20 are provided with cam-locking mechanisms 56 shown in FIGS. 5 and 6. Each cam-locking mechanism 56 comprises a toothed cam 58 as shown in FIG. 6. The cam-locking mechanism 56 is mounted on a support 60 that allows rotation of the cam-locking mechanism 56 about the support 60. It will be apparent to one of ordinary skill in the art that a wide variety of mounting techniques for the cam-locking mechanism 56 can be used, provided the technique enables frictional engagement of the toothed cam 58 with the inner telescoping section 34 of the boom assembly 20. The cam-locking mechanism 56 is retained in its disengaged position A by hydraulic pressure. When the hydraulic pressure drops to a level where the hydraulic cylinder 40 might begin to retract unexpectedly, the cam-locking mechanism 56 rotates under pressure from spring 57 to engage the boom assembly 20 to which it is mounted. This engagement prevents retraction of the hydraulic cylinder 40, thus preventing unexpected lowering of the cask 30. The unlocking cylinder 61 is pressurized to release the cam-locking mechanism 56 from its fictionally engaged configuration.

The platform 14 and the tread mechanism 16 enable the cask 30 to be transported over uneven ground and through buildings with minimum floor loading concentrations. The platform 14 comprises a substantially C-shaped structure as shown in FIG. 3. This shape of the platform 14 allows the cask transporter system 10 to be driven over and around the cask 30 for engagement therewith. Gussets 62 are provided to strengthen the corners of the platform 14. The gantry 12 is located midway along the platform 14 and is rigidly connected thereto as described hereinbefore. While various materials can be used for all of the components referred to herein, preferably steel or other durable materials are used.

The platform 14 is carried by the tread mechanism 16 as coupled thereto. The tread mechanism 16 comprises a left track 64 and a right track 66 mounted on guide rollers 68 and drive sprockets 70 in a conventional manner. The left track 64 and right track 66 are held in a desired spaced relationship by the platform 14 and its connections to the left track 64 and right track 66. The tread mechanism 16 provides substantial surface area over which the weight of the cask 30 being carried by the gantry 12 can be distributed, thereby minimizing floor loading concentrations.

The restraining system 24 is coupled to the gantry 12 to prevent the cask 30 from swinging and adversely affecting the stability of the cask transporter system 10. Through various types of restraining systems can be used, preferably a damped system comprising cushion hydraulic cylinders 72 coupled in a conventional manner to an accumulator 74 is used. This damped restraint enhances the stability of the cask transporter system 10, allowing quicker and safer braking.

While a particular embodiment of the invention has been shown and described, it will become obvious to those skilled in the art that changes and modifications may be made without departing from the invention in its broader aspects, and, therefore, the aim in the appended claims is to cover all such changes and modifications as fall within the true spirit and scope of the invention.

I claim:

1. A cask transporter for transporting nuclear waste casks comprising:

a mobile platform having laterally opposed longitudinally extending sides, a closed longitudinal area, and an open area extending between said sides and configured to receive a cask to be transported when said platform moves toward the cask, a lift position being located in said open area and being configured to receive the cask;

a gantry including a pair of substantially vertical extendable booms extending upwardly from said sides at said lift position, each of said booms including a base that is mounted on said platform such that said bases are immovable relative to one another and to said platform;

a beam extending substantially horizontally across the upper ends of said extendable booms;

one or more couplers carried on said beam for connecting said beam to an upper end portion of the cask when the cask is in said lift position so that the cask is raised when said extendable booms are extended to raise said beam;

a restraint, coupled to said platform and engageable with the cask, for retaining the cask against swinging movement relative to said cask transporter when the cask is being transported by said cask transporter;

wherein said restraint is damped to permit limited movement of the cask relative to said platform;

a pair of substantially parallel, spaced treads on which said platform is mounted; and which are configured to ride along the ground; and a motor which is supported on said platform and which drives said treads to propel said cask transporter.

2. A cask transporter as defined in claim 1, wherein said restraint includes one or more hydraulic cylinders.

3. A cask transporter as defined in claim 2, wherein said restraint comprises shock-absorbing members mounted on said gantry.

4. A cask transporter as defined in claim 3, wherein said shock absorbing members comprise an accumulator and said hydraulic cylinders comprise cushion hydraulic cylinders coupled to said accumulator.

5. A cask transporter as defined in claim 1, wherein said platform is substantially C-shaped.

6. A cask transporter as defined in claim 1, further comprising beam joints that connect opposed ends of said beam to the upper ends of said extendable booms and that are configured to laterally rigidify the gantry by preventing movement of said beam relative to the upper ends of said extendable booms laterally of said platform.

7. A cask transporter as defined in claim 6, wherein each of said beam joints comprises a joint pin extending longitudinally of said platform and rigidly coupling said beam directly to a portion of the associated boom that is fixed from pivoting motion relative to the base of the associated boom.

8. A cask transporter comprising:
- a mobile platform having 1) laterally opposed longitudinally extending sides, 2) a first, closed longitudinal end area extending between said sides, and 3) a second, open longitudinal end area extending between said sides and configured to receive a cask to be transported when said platform moves toward the cask from a position in which said second end area is spaced from but aligned with the cask, a lift position being located longitudinally between said first and second end areas and being configured to receive the cask after said second longitudinal end area moves past the cask;
- a gantry including a pair of substantially vertical extendable booms extending upwardly from said sides at said lift position, each of said booms including a hydraulic cylinder which is selectively extendible and retractable to extend and retract the associated extendable boom, each of said booms including a base that is mounted on said platform such that said bases are immovable relative to one another and to said platform;
- a single beam extending substantially horizontally across the upper ends of said extendable booms and raisable with said extendable booms, said beam being connected to said upper ends of said booms by joints that accommodate extension discrepancies between said booms while preventing movement of said beam relative to said booms laterally of said platform;
- one or more couplers carried on said beam for connecting said beam to an upper end portion of a cask to be transported when the cask is in said lift position so that the cask is raised when said extendable booms are extended to raise said beam;
- a pair of substantially parallel, spaced treads on which said platform is mounted and which are configured to ride along the ground; and
- a motor which is supported on said platform and which drives said treads to propel said cask transporter.

9. A cask transporter as defined in claim 8, further comprising a restraint coupled to said platform and engageable with the cask for retraining the cask against swinging movement relative to said cask transporter when the cask is being transported by said cask transporter.

10. A cask transporter as defined in claim 9, wherein said restraint is damped to permit limited movement of the cask relative to said platform.

11. A cask transporter as defined in claim 10, wherein said restraint comprises shock-absorbing members mounted on said gantry.

12. A cask transporter as defined in claim 11, wherein said shock absorbing members comprises an accumulator and cushion hydraulic cylinders coupled to said cushion hydraulic cylinders.

13. A cask transporter as defined in claim 8, wherein said platform is substantially C-shaped.

14. A cask transporter comprising:
- a substantially C-shaped, self-propelled mobile platform having 1) laterally opposed longitudinally extending sides, 2) a first, closed longitudinal end area extending between said sides and supporting operator's controls, and 3) a second, open longitudinal end area extending between said sides and configured to receive a cask to be transported when said platform moves toward the cask from a position in which said second end area is spaced from but aligned with the cask, a lift position being located longitudinally between said first and second end areas and being configured to receive the cask after said second longitudinal end area moves past the cask;
- a gantry including a pair of substantially vertical spaced extendable booms extending upwardly from said sides at said lift position, each of said booms including a telescoping tube, a single hydraulic cylinder which is selectively extendible and retractable to extend and retract the associated extendable boom, each of said booms including a base that is mounted on said platform such that said bases are immovable relative to one another and to said platform;
- a single beam extending substantially horizontally across the upper ends of said extendable booms and raisable with said extendable booms, said beam being connected to the upper ends of said booms by pin joints to allow for slight variation in the extension of said booms while preventing movement of said beam laterally of said platform;
- one or more couplers carried on said beam for connecting said beam to an upper end portion of the cask when the cask is in said lift position so that the cask is raised when said extendable booms are extended to raise said beam;
- a pair of substantially parallel, spaced treads on which said platform is mounted and which are configured to ride along the ground; and
- a motor which is supported on said platform and which drives said treads to propel said cask transporter.

15. A cask transporter as defined in claim 14, further comprising a restraint coupled to said platform and engageable with the cask for retraining the cask against swinging movement relative to said cask transporter when the cask is being transported by said cask transporter;
- wherein said restraint is damped to permit limited movement of the cask relative to said platform.

16. A cask transporter for transporting spent nuclear fuel rod storage casks, comprising:
- a mobile platform having opposed longitudinally extending sides, a closed longitudinal area, and an open area, said open area being disposed between said sides and configured to receive a spent nuclear fuel rod storage cask to be transported when said platform moves toward the spent nuclear fuel rod storage cask, said open area defining a lift position which is sufficiently wide and long to receive the spent nuclear fuel rod storage cask;
- a gantry having only two substantially vertical extendable booms extending upwardly from said sides at said lift position, each of said booms including a base that is mounted on said platform such that said bases are immovable relative to one another and to said platform;
- a beam extending substantially horizontally across the upper ends of said extendable booms at a location which is at least substantially at a longitudinal center of said open area, said beam being raisable with said extendable booms, wherein said beam and said extendable booms are configured such that, when the extendable booms are fully retracted, said beam is sufficiently high to be above the level of an upper end of the spent nuclear fuel rod storage cask;
- a restraint which is coupled to said platform and which is dimensioned and configured so as to be engageable with the spent nuclear fuel rod storage cask so as to restrain the spent nuclear fuel rod storage cask against swinging movement relative to said cask transporter when the spent nuclear fuel rod storage cask is being transported by said cask transporter;

a pair of substantially parallel, spaced treads on which said platform is mounted and which are configured to ride along the ground; and a motor which is supported on said platform and which drives said treads to propel said cask transporter.

17. A cask transporter as recited in claim 16, wherein said cask transporter is dimensioned and configured to lift and transport a spent nuclear fuel rod storage cask weighing 135 tons.

18. A cask transporter as recited in claim 17, wherein said cask transporter is dimensioned and configured to lift and transport a spent nuclear fuel rod storage cask which is seventeen-feet high.

19. A cask transporter as recited in claim 16, wherein said gantry is located midway along said platform and is rigidly connected thereto.

20. A cask transporter as defined in claim 16, further comprising beam joints that connect opposed ends of said beam to the upper end of said extendable booms and that are configured to laterally rigidify the gantry by preventing movement of said beam relative to the upper ends of said extendable booms laterally of said platform.

21. A cask transporter as defined in claim 20, wherein each of said beam joints comprises a joint pin extending longitudinally of said platform and rigidly coupling said beam directly to a portion of the associated boom that is fixed from pivoting motion relative to the base of the associated boom.

22. In combination:
a substantially cylindrical, vertically oriented spent nuclear fuel rod storage cask which is dimensioned and configured to contain spent nuclear fuel rods, said cask having an upper end and a sidewall; and a cask transporter for transporting said cask, said cask transporter including
a mobile platform having opposed longitudinally extending sides, a closed longitudinal area, and an open area, said open area being disposed between said sides and configured to receive said cask when said platform moves toward said cask, said open area defining a lift position which is sufficiently wide and long to receive said cask, a gantry having only two substantially vertical extendable booms extending upwardly from said sides at said lift position, said booms being capable of lifting said cask and of holding said cask in a lifted position during transport, each of said booms including a base that is mounted on said platform such that said bases are immovable relative to one another and to said platform, a beam extending substantially horizontally across the upper ends of said extendable booms at a location which is at least substantially at a longitudinal center of said open area, said beam being raisable with said extendable booms, wherein said beam and said extendable booms are configured such that, when the extendable booms are fully retracted, said beam is sufficiently high to be above the level of said upper end of said cask;

a restraint which is coupled to said platform and which is dimensioned and configured so as to be engageable with said cask so as to restrain said cask against swinging movement relative to said cask transporter when said cask is being transported by said cask transporter, a pair of substantially parallel, spaced treads on which said platform is mounted and which are configured to ride along the ground, and a motor which is supported on said platform and which drives said treads to propel said cask transporter.

23. A combination as defined in claim 22, further comprising beam joints that connect opposed ends of said beam to the upper end of said extendable booms and that are configured to laterally rigidify the gantry by preventing movement of said beam relative to the upper ends of said extendable booms laterally of said platform.

24. A combination as defined in claim 23, wherein each of said beam joints comprises a joint pin extending longitudinally of said platform and rigidly coupling said beam directly to a portion of the associated boom that is fixed from pivoting motion relative to the base of the associated boom.

25. In combination:
a substantially cylindrical, vertically oriented spent nuclear fuel rod storage cask which is dimensioned and configured to contain spent nuclear fuel rods, said cask having an upper end and a sidewall, said cask being about seventeen feet high and weighing about 135 tons; and a cask transporter for transporting said spent nuclear fuel rod storage cask, said cask transporter including
a mobile platform having opposed longitudinally extending sides, a closed longitudinal area, and an open area, said open area being disposed between said sides and configured to receive said cask when said platform moves toward said cask, said open area defining a lift position which is sufficiently wide and long to receive said cask, a gantry having only two substantially vertical extendable booms extending upwardly from said sides at said lift position, said booms being capable of lifting said cask and of holding said cask in a lifted position during transport, each of said booms including a base that is mounted on said platform such that said bases are immovable relative to one another and to said platform, a beam extending substantially horizontally across the upper ends of said extendable booms and raisable with said extendable booms, wherein said beam and said extendable booms are configured such that, when the extendable booms are fully lowered, said beam is sufficiently high to be above the level of said upper end of said cask, and wherein said beam is connected to said upper ends of said booms by joints that accommodate extension discrepancies between said booms while preventing movement of said beam relative to said booms laterally of said platform, a restraint which is coupled to said platform and which is dimensioned and configured so as to be engageable with said cask so as to restrain said cask against swinging movement relative to said cask transporter when said cask is being transported by said cask transporter, a pair of substantially parallel, spaced treads on which said platform is mounted and which are configured to ride along the ground, and a motor which is supported on said platform and which drives said treads to propel said cask transporter.

26. A cask transporter for transporting spent nuclear fuel rod storage casks, comprising:

a mobile platform having opposed longitudinally extending sides, a closed longitudinal area, and an open area, said open area being disposed between said sides and configured to receive a spent nuclear fuel rod storage cask to be transported when said platform moves toward the spent nuclear fuel rod storage cask, said open area defining a lift position which is sufficiently wide and long to receive the spent nuclear fuel rod storage cask;

a gantry having only two substantially vertical extendable booms extending upwardly from said sides at said lift position, each of said booms including a base that is mounted on said platform such that said bases are immovable relative to one another and to said platform;

a beam extending substantially horizontally across the upper ends of said extendable booms, said beam being raisable with said extendable booms, wherein said beam and said extendable booms are configured such that, when the extendable booms are fully retracted, said beam is sufficiently high to be above the level of an upper end of the spent nuclear fuel rod storage cask;

a restraint which is coupled to said platform and which is dimensioned and configured so as to be engageable with the spent nuclear fuel rod storage cask so as to restrain the spent nuclear fuel rod storage cask against swinging movement relative to said cask transporter when the spent nuclear fuel rod storage cask is being transported by said cask transporter;

a pair of substantially parallel, spaced treads on which said platform is mounted and which are configured to ride along the ground; and a motor which is supported on said platform and which drives said treads to propel said cask transporter.

* * * * *

UNITED STATES PATENT AND TRADEMARK OFFICE
CERTIFICATE OF CORRECTION

| | | |
|---|---|---|
| PATENT NO. | : 6,328,524 B1 | Page 1 of 1 |
| DATED | : December 11, 2001 | |
| INVENTOR(S) | : Roger L. Johnston | |

It is certified that error appears in the above-identified patent and that said Letters Patent is hereby corrected as shown below:

<u>Column 5,</u>
Line 32, change "a" to -- the --
Line 44, change "retraining" to -- restraining --.
Lines 55-56, change second occurrence of "cushion hydraulic cylinders" to
-- accumulator --.

<u>Column 8,</u>
Line 11, change "end" to -- ends --.

Signed and Sealed this

Thirtieth Day of April, 2002

Attest:

*Attesting Officer*

JAMES E. ROGAN
*Director of the United States Patent and Trademark Office*